3,694,228
FRIED CAKE MIX COMPOSITION
Arthur Hochhauser, Brooklyn, and Frank Clark, New York, N.Y., assignors to DCA Food Industries, Inc., New York, N.Y.
No Drawing. Filed May 5, 1970, Ser. No. 34,890
Int. Cl. A21d 13/08, 2/28
U.S. Cl. 99—92                                                          15 Claims

ABSTRACT OF THE DISCLOSURE

A coreless fried cake or doughnut product having a specific volume greater than 4.0 cc./gram is formed from a novel mix composition comprising 10–12 wt. percent total proteins of which 50 to 70% are gluten proteins and the balance are dispersible proteins. The composition also includes minor amounts of a sulfhydryl reducing agent and a fatty acid ester of sorbitol as an emulsifier.

---

This invention relates generally to an improved comestible product and a novel composition of matter for the manufacture thereof. More particularly, this invention relates to a novel comestible composition for the production of improved fried cakes, such as doughnuts, and to improved products made from such comestible composition.

In conventional methods of producing fried cakes, such as doughnuts, precut and shaped pieces of dough are cooked in two parts. During the first part of the cooking process, the dough is dropped into a cooking vessel containing hot liquid fat or oil and floats on the surface of the fat where it is fried and the dough expands so that the product assumes an enlarged and less dense state. Since the dough is not completely submerged in the fat, only the lower half of the product is thoroughly cooked and expanded and it is necessary to turn the product over in order to fry and expand the side of the product which originally floated above the surface of the fat.

This conventional process for manufacturing doughnuts suffers from many drawbacks and usually results in products of inferior quality. In particular, while the first side of the doughnut is being fried and expanded to the desired physical state, the second side, which rides above the surface of the fat, does not receive sufficient heat for expansion although it does lose sufficient moisture and leavening to form an unexpandable crust. As a result, when the doughnut is turned and fried on its second side it will not fully expand. Thus, doughnuts produced in this manner exhibit a relatively low specific volume compared to the theoretically attainable specific volume for the type of dough employed in the process. Moreover, doughnuts produced in this manner normally include a thickened area or higher density core within their internal structure which is the result of the inability of the dough to fully expand. Such cores are highly undesirable since they reduce the uniformity and eating characteristics of the product. More importantly, the presence of the relatively dense inner core drastically reduces the shelf life of the product since the higher density core tends to harden and stale rapidly.

Attempts have been made to improve the conventional doughnut-making process and particularly to eliminate the formation of the objectionable product core. One such method is described in co-pending and commonly assigned application Ser. No. 519,255, filed on Jan. 7, 1966, and in general terms, involves the simultaneous frying and microwave cooking of the doughnut. As described in said co-pending application, shaped pieces of dough are deposited in a cooking vessel containing hot oil and are rapidly fried on one side. The partially cooked product emerging from this step of the process has its upper face still in an uncrusted unexpanded state and its bottom, submerged face in a crusted, substantially expanded state. This partially cooked product is then moved to a microwave heating zone where it is internally heated and expanded. Subsequent to this exposure, cooking may be completed by inverting the product and frying its second side.

Although the utilization of microwave heating in a process for the production of fried cake and doughnut products results in a novel coreless product, as more fully described in copending and commonly assigned application, Ser. No. 34,905, filed May 5, 1970, and now abandoned, it has been found that the products of such a process can be further improved. Specifically, the application of microwave heating may in some instances cause difficulty in controlling the shape of the product. The non-uniform shapes observed in processes utilizing microwave heating techniques appear to be the result of the inability of conventional dough mixes to withstand the processing conditions.

It is an object of the present invention to provide a novel composition of matter for the production of comestible products.

It is another object of the invention to provide a novel composition for the production of fried cakes which is particularly suitable for use with a cooking method employing microwave heating.

A further object of the invention is to provide a novel dough composition useful in the production of coreless fried cake products having a high specific volume.

Yet another object of the present invention is to provide improved coreless fried cake products, such as doughnuts and the like, of uniform shape and quality having a higher specific volume than comparable prior art products.

The above and other objects of the present invention are achieved by the utilization of a novel mix composition as the starting material in the formation of a dough which is particularly adapted for a frying and microwave cooking process, such as the process described in detail in said copending application Ser. No. 519,255. It has now been discovered that the use of a mix composition which incorporates a high percentage of proteins, particularly gluten proteins, in combination with selected reducing agents and emulsifiers results in a novel coreless cake product having a higher specific volume, greater than 4.0 cc./gram, and a more regular uniform shape than heretofore obtainable. In contrast to the mix compositions normally employed in the preparation of doughs for fried cakes and doughnuts, the ingredients of the novel mix composition are particularly selected for their ability to control the shape and uniformity of the product under conditions of rapid product expansion induced by intense heating. Thus, by virtue of the present invention, a novel standard size coreless doughnut may be formed from a smaller amount of dough due to greater expansion thereby resulting in a fluffier, more tender product having improved eating qualities and shelf life.

Moreover, although the fat content of each doughnut remains approximately the same as in a doughnut of equal size formed from a conventional dough composition, the ratio of fat to solids is increased thereby enhancing the eating qualities of the product without adding to its cost.

The mix composition contemplated by the present invention is preferably a dry mix although it may also be formulated from wet ingredients. The mix may include the following ingredients, the weight percent range given with each material representing the broad and preferred ranges of amounts of each material:

| Ingredients | Weight percent | |
|---|---|---|
| | Broad range | Preferred range |
| Total proteins | 10-12 | 10.5-11.5 |
| Dispersible proteins | | 3.1-5.8 |
| Gluten proteins | | 5.8-8.1 |
| Emulsifier | 0.1-2.0 | 0.10-1.0 |
| Reducing agent | [1] 0.0-50 | [1] 3-30 |
| Leavening | 1.0-5.0 | 1.5-2.5 |
| Sugar | 10-40 | 25-35 |
| Shortening | 1.0-9.0 | 3.0-5.0 |
| Salt | 0.1-2.0 | 0.8-1.2 |
| Miscellaneous colors and flavors | | 0.0-1.0 |

[1] Parts per million.

The amount and type of proteins employed in the mix composition are critical features of the invention. It is essential that the mix contain from 10 to 12 wt. percent, preferably 10.5 to 11.5 wt. percent, total proteins of which 30 to 50 wt. percent (3.1 to 5.8% of the total dry mix) are dispersible or soluble proteins and 50 to 70 wt. percent (5.8 to 8.1% of the total dry mix) are gluten proteins.

A wide variety of ingredients may be employed in the composition as the source of dispersible proteins. Typical examples of such materials include flours such as defatted soya flour, corn-flour and cotton seed flour; milk such as skim milk solids; egg products such as egg albumen and egg yolk; and caseins such as sodium caseinate. The amount and type of gluten proteins is also a critical feature of the invention. It has been found that 55 to 75 wt. percent of the gluten proteins should be derived from a hard wheat flour such as hard spring wheat flour and 25 to 45 wt. percent of the gluten proteins should be derived from a soft wheat flour such as soft red winter wheat flour.

It is an essential feature of the invention that a minor amount of a protein reducing agent be employed in combination with the protein to modify its rheological properties and thereby improve the shape and fat absorption qualities of the cake product. Typical protein reducing agents include edible sulfhydryl compounds such as those which occur naturally in whey and gluthathione. The preferred sulfhydryl compound is L-cystein. Only a small amount of the edible sulfhydryl material is required and ordinarily 3 to 30 parts per million (p.p.m.) of the total dry mix composition is required for this purpose.

The mix composition is also characterized by the inclusion of minor amounts of an amulsifier which acts as a lubricant for the dough thereby aiding in the expansibility and shape retention characteristics of the proteins and also in the control of the fat adsorption properties of the composition. It has been discovered that edible mono fatty acid esters of the hexahydric alcohol, sorbitol, such as sorbitan mono stearate or sorbitan mono palmitate possess unique properties with respect to the control of fat absorption. While fatty acid esters of trihydric alcohols may also be employed, their use is less preferred.

The novel mix composition of the invention also requires the incorporation of a chemical leavening agent in amounts ranging from 1 to 5 wt. percent, for example 2.5 wt. percent of the dry composition. The selection of a particular chemical leavening agent is not critical and a wide variety of materials may be employed for this purpose. Typical leaveners include glucono delta lactone, phosphoric acid derivatives such as mono calcium phosphate and sodium acid phosphate and baking soda.

A variety of sugars may be employed in the composition of the invention, for example, dextrose, lactose, sucrose or combinations thereof. In addition, a wide variety of natural and artificial flavors, colorings and seasonings and shortenings or other conventional dough ingredients may be present in minor amounts.

The invention will be further understood by reference to the following illustrative examples.

EXAMPLE I

A dry mix composition in accordance with the invention is formulated from the following ingredients:

Hard spring wheat flour—31.9 parts
Soft red winter wheat flour—23.3 parts
Defatted soya flour—6.0 parts
Sugars—30.5 parts
Skim milk solids—1.4 parts
Whole egg—0.7 parts
Chemical leavener—2.5 parts
Salt—0.7 parts
Sorbitan mono stearate—0.4 parts
L-cysteine—15 p.p.m.
Tartrazine and vanilla—0.1 parts 100 parts of the above relatively dry dough mix is mixed with 40 to 50 parts, preferably 46 to 48 parts of water which is kneaded to form a dough and is then extruded to form a doughnut of toroidal shape. The shaped dough is permitted to drop into a cooking vessel containing cooking oil at a temperature of 370° to 390° F. After initial submergence, the toroidally shaped pieces are advanced through the cooking vessel at the rate of 3 to 5 dozen/minute with their lower portion immersed in the hot oil and are cooked for a period of 6 to 10 seconds. Subsequently, the partially cooked pieces enter into a high frequency field zone where it is exposed to a high frequency electro-magnetic field having a wave length of 12.3 centimeters at a power of 1.8 to 2.2 kilowatts for a period of 35 to 45 seconds. The dough pieces are removed from the high frequency zone and inverted and their opposite faces are fried in hot oil for a period of about 35 to 55 seconds.

The doughnut product emerging from the process is a fully cooked and crusted coreless doughnut having a uniform toroidal shape and a specific volume greater than 4.0 cc./gram.

Having thus described the general nature as well as specific embodiments of the invention, the full scope of the invention will now be pointed out in the claims.

What is claimed is:

1. A fried cake mix composition comprising 10 to 12 wt. percent proteins, said proteins including 50 to 70 wt. percent gluten proteins and 30 to 50 wt. percent dispersible proteins, said gluten proteins being derived from hard and soft wheat flours, minor amounts of a protein reducing agent and an emulsifier and 1 to 5 wt. percent of a chemical leavening agent.

2. The mix of claim 1 wherein said reducing agent is a sulfhydryl compound.

3. The mix of claim 2 wherein said reducing agent is L-cysteine.

4. The mix of claim 1 wherein said emulsifier is a mono-fatty ester of sorbitol.

5. The mix of claim 1 wherein 55 to 75 wt. percent of said gluten proteins are derived from hard wheat flour and 25 to 45 wt. percent of said gluten proteins are derived from soft wheat flour.

6. The mix of claim 1 further including sugar, shortening, and salt.

7. A fried cake mix composition comprising 10 to 12 wt. percent proteins, wherein 50 to 70 wt. percent of said proteins are gluten proteins and 30 to 50 wt. percent of said proteins are dispersible proteins, said gluten proteins being derived from hard and soft wheat flours, 5 to 30 parts per million of a sulfhydryl compound, 0.25 to 1.0 wt. percent of a fatty acid ester of sorbital, and 1 to 5 wt. percent of a chemical leavening agent.

8. A fried cake dough composition comprising 100 parts of a dry mix composition comprising 10 to 12 wt. percent proteins wherein 50 to 70 wt. percent of said proteins are gluten proteins and 30 to 50 wt. percent of said proteins are dispersible proteins, said gluten proteins being derived from hard and soft wheat flours and being modified by the presence of minor amounts of a protein reducing agent and an emulsifier, 1 to 5 wt. percent of a chemical leavening agent and 40 to 55 parts of water.

9. The dough composition of claim 8 wherein said reducing agent comprises 3 to 30 parts per million of a sulfhydryl compound.

10. The dough composition of claim 9 wherein said reducing agent is L-cysteine.

11. The dough composition of claim 8 wherein said emulsifier comprises 0.10 to 1.0 wt. percent of a monofatty ester of sorbitol.

12. The dough composition of claim 8 wherein 55 to 75 wt. percent of said gluten proteins are derived from hard wheat flour and 25 to 45 wt. percent of said gluten proteins are derived from soft wheat flour.

13. A method of producing fried cake products comprising preparing a dough comprising 40 to 55 parts water and 100 parts of a mix comprising 10 to 12 wt. percent proteins wherein 50 to 70 wt. percent of said proteins are gluten proteins and 30 to 50 wt. percent of said proteins are dispersible proteins, said gluten proteins being derived from hard and soft wheat flours, and being modified by the presence of minor amounts of a protein reducing agent and an emulsifier, and 1 to 5 wt. percent of a chemical leavening agent, extruding shaped pieces of said dough, externally applying heat to one side of the shaped dough to form a crust thereon while leaving the other side thereof in a relatively expandable state and subjecting said partially crusted piece of dough to a high frequency electro-magnetic field to internally heat said dough and effect the expansion thereof.

14. The method of claim 13 including the step of externally heating said other side of said dough to form a crust thereon.

15. The method of claim 13 wherein said crust is formed by cooking said piece of dough partially submerged in hot oil to form said crust on the submerged face of said dough piece, while leaving the unsubmerged other face thereof in a substantially expandable state.

References Cited
UNITED STATES PATENTS

| | | | |
|---|---|---|---|
| 3,479,188 | 11/1969 | Thelen | 99—86 |
| 3,152,910 | 10/1964 | Sugihara | 99—94 |
| 3,481,745 | 12/1969 | Borer et al. | 99—92 |

RAYMOND N. JONES, Primary Examiner

U.S. Cl. X.R.

99—94